March 22, 1927.
W. G. WILSON
1,622,016
APPARATUS FOR CONTROLLING THE FLOW OF FLUID TO A VALVE
Filed June 20, 1923    2 Sheets-Sheet 1
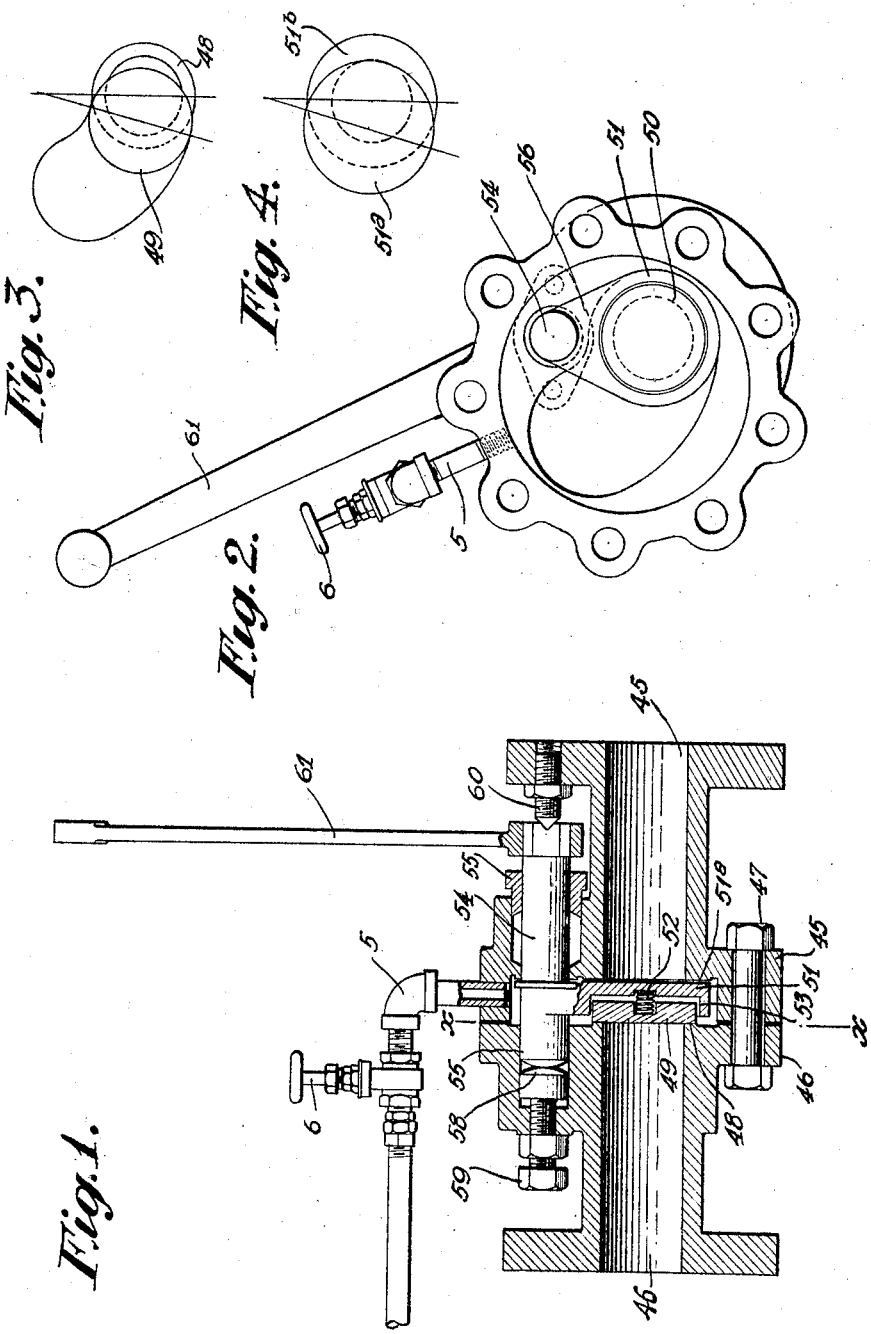
INVENTOR.
Wylie G. Wilson
BY
his ATTORNEYS.

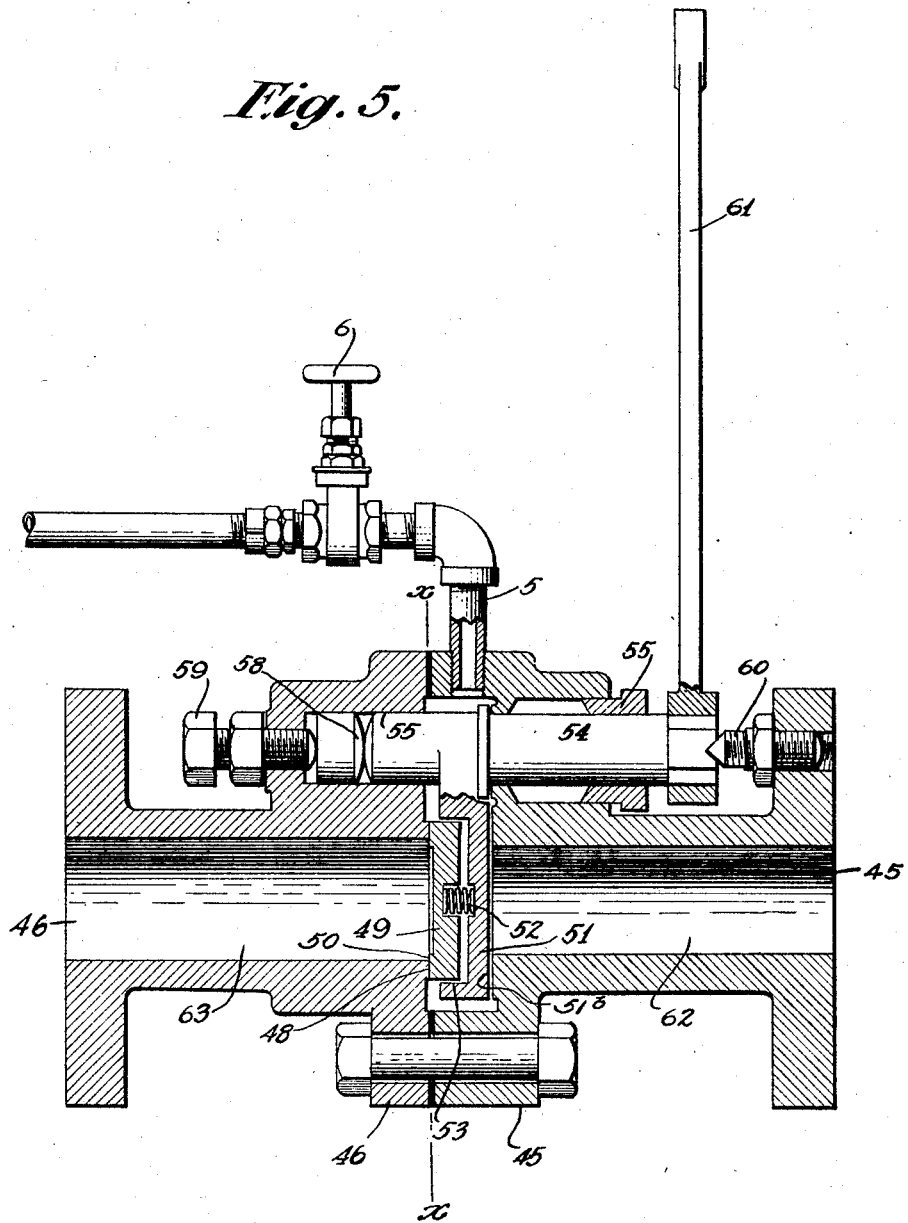

Patented Mar. 22, 1927.

1,622,016

UNITED STATES PATENT OFFICE.

WYLIE G. WILSON, OF JERSEY CITY, NEW JERSEY, ASSIGNOR TO LOOSE SEAT VALVE COMPANY, A CORPORATION OF DELAWARE.

APPARATUS FOR CONTROLLING THE FLOW OF FLUID TO A VALVE.

Application filed June 20, 1923. Serial No. 646,698.

This invention relates to an improved method for controlling the flow of fluid under pressure in a conduit, together with improved apparatus for accomplishing the said method. The invention is applicable under conditions where fluid under pressure is caused to pass through a conduit having interposed therein a valve adapted for the purpose of controlling the flow of fluid through the conduit.

One object of the invention is to provide means whereby fluid carrying in suspension foreign matter such as fibrous material, gritty particles of appreciable dimension, such as scale which may slough off from boiler tubes, or other like substances, may be restrained at a point adjacent the valve and in the direction of the flow of the fluid towards the valve at the time of the opening or closing of the valve, so that said foreign matter may not interfere with the free operation of the valve by reason of the clogging of the valve casing with such foreign matter in a way to interfere with the free movement of the valve elements. With the same purpose in view, that is to say, the keeping of such foreign matter out of the valve casing so as to avoid contamination or clogging of the valve, the flow of the fluid is so directed through the valve casing by a contraction of the supply conduit and an expansion of the outgoing conduit as to cause such foreign matter to pass through the valve casing with the minimum amount of deposit of such foreign matter in the casing.

Other objects of the invention are to so operate the apparatus as to relieve the faces of the valve seat and valve sealing element from injury by reason of the flow of fluid through the valve, be the same with or without gritty particles. It is also the purpose of the invention to so control the flow of fluid as to avoid what is known as "shock" which is incident to the closing of a valve interposed in the path of the fluid flowing through a conduit under pressure, causing rapid stoppage of a considerable column of liquid.

In accomplishing the purposes and objects of the invention above referred to, it is contemplated that a valve is interposed in a conduit carrying the fluid under pressure. In such conduit in the path of said fluid flowing through the valve is mounted what is characterized herein as a constrictor which, broadly speaking, comprises means for limiting but not entirely cutting off the flow of fluid to the valve. The constrictor referred to is so constructed that the fluid flowing through the same is caused to pass between adjacent walls offering only a narrow aperture for the passage of the fluid free from suspended foreign matter such as fiber or grit, thus operating as a filter to restrain the passage of such foreign matter, and yet permitting the fluid free from such foreign matter to pass through the constrictor. The word "constrictor" is employed in the absence of any known word that would adequately describe the structure; the object of such constrictor is to provide a constriction in the conduit. The word generally is defined by Webster as a "drawing together or contraction, or a constrictor, that which draws together or contracts, or as used pathologically a stricture, the abnormal narrowing of a canal, duct or passage." None of these definitions exactly describes the instrument employed, the intent being in this specification and these claims to use the word "constrictor" to denote an instrument so constructed as to form a stricture in a conduit so as to reduce the flow of fluid in the conduit to a predetermined quantity or degree, or reduce the aperture for flow to a relatively very small size as to length or breadth so as to act as a filter as previously explained. It is also contemplated that such constrictor shall be capable of adjustment to vary the degree of such constriction from a predetermined minimum to a maximum where the constriction will be removed and the free flow of fluid permitted through the conduit.

It is contemplated that a constrictor such as that defined is mounted in the conduit adjacent the valve in the path of the fluid flowing towards the valve. When it is desired to partially reduce the pressure of the fluid controlled by the valve, the constrictor is brought to a position where it permits a minimum flow of fluid through the same. The valve being closed, that section of the conduit lying between the constrictor and the valve will become filled with fluid, and when filled the fluid pressure on both sides of the constrictor will be the same. To open the valve under such conditions requires necessarily the same force or power that would be required if the constrictor were omitted; that is to say, in the initial movement of the valve, but as soon as the valve is opened sufficiently to permit a flow of fluid through the valve in excess of that supplied through the constrictor, the pressure will fall and during the remaining period when the valve is being opened the pressure will be minimized in proportion to the relative capacity of the valve to the minimum capacity of the constrictor. When the valve is fully opened the constrictor is operated so as to remove the constriction and permit the free flow of fluid through the conduit.

When it is desired to close the valve the first step is to close the constrictor so as to limit the passage of fluid therethrough to the minimum of its capacity. This will operate to limit the flow of fluid towards the valve to such minimum. The valve may then be closed under conditions where there is practically no fluid pressure opposed to the closing of the valve, for the construction may be such that the fluid pressure in that section of the conduit lying between the constrictor and the valve will not accumulate with sufficient rapidity to cause the fluid pressure to rise to normal pressure before the closing of the valve has been accomplished. This is one phase of the method, when the volume of fluid permitted to pass the constrictor is relatively small, and the fluid capacity of the conduit between the constrictor and valve is relatively great.

A further phase of the operation of the method is that of employing, in addition to the valve and constrictor means described, a means for bleeding from that section of the conduit lying between the constrictor and the valve, sufficient fluid in excess of that supplied through the constrictor to reduce the fluid pressure controlled by the valve. Under such conditions the valve is opened at a time when the fluid pressure controlled thereby is materially reduced, the degree of such reduction of course being dependent on the quantity of fluid supplied by the constrictor during a predetermined time relative to the quantity of fluid withdrawn from that section of the conduit by the bleeder means referred to during the same time, and to the expansibility of the fluid.

When the valve is open, either partially, that is to say, to a point where damage incident to the flow of fluid through a partially open valve is removed, or where the valve is entirely open, the bleeding operation is discontinued and the constriction removed so that the full flow of fluid towards the valve will be accomplished. In like manner, to close the valve under reduced pressure the constrictor is first closed, then the bleeder is opened and the valve is closed as heretofore stated under relatively reduced pressure.

Another object of the invention is to construct the conduit so that when fluid carrying foreign matter suspended therein is caused to pass through a conduit, bisected by a valve, the flow of fluid will be so directed in its passage through the valve casing as to avoid the lodgment of such foreign particles in the casing in a way to interfere with the movement of the operative parts of the valve, that is to say, the purpose of such device being to minimize, as far as possible, the accumulation of foreign matter in the valve casing. This improvement contemplates the idea of forming the conduit in two sections, with a valve casing interposed between said sections, and making the supply section of less diameter than that section adapted to convey the fluid away from the casing.

It is known in this art that when a fluid controlling valve is being opened under conditions where fluid under high pressure escapes through such opening, injury to the faces of the valve seat and sealing element of the valve is likely to occur by reason of the rapid flow of fluid through the aperture, caused by the partial opening of the valve, and particularly is this so where such fluid carries in suspension therein foreign matter such as gritty particles and the like, occasioning increased erosion of the exposed surfaces due to wire-drawing of the fluid. It is obvious that the greater the fluid pressure, the greater the possibility of damage to such faces, and in like manner, the less the fluid pressure the less likelihood for such damage; hence that object of this invention which contemplates the partial reduction of the fluid pressure at the time of the opening and closing of the valve operates to reduce the likelihood of such damage to said valve faces.

Shock which occurs when a column of fluid in motion under pressure, or under conditions of momentum, is suddenly checked by the closing of a valve is also relatively dependent upon the velocity which in turn is dependent upon the degree of fluid pressure. To reduce such condition of pressure and momentum at the time of the opening and closing of the valve, operates to minimize the shock conditions above referred to.

The apparatus employed in the practice of the invention herein described is illustrated in the accompanying drawings, the parts being designated by numerals, like numerals referring to like parts.

Figure 1 is a vertical section, partly in elevation, showing a conduit with a slide valve interposed therein, and a second form of constrictor cooperating with said valve, and a bleeder leading from the valve casing to drain the fluid lying between the valve and the constrictor.

Figure 2 is an end view of a valve casing and its associate elements.

Figures 3 and 4 are diagrammatic views showing the relative position of the valve sealing element with reference to its seat and the relative position of the constrictor with reference to its opposed face at the time when the constrictor is ceasing to fully constrict, and the relative position of said sealing element and constrictor.

Figure 5 is the same as Figure 1 except that the intake conduit is shown as of less diameter than the outgo conduit.

Referring to Figures 1 to 5 inclusive, 45 represents one section of a conduit, and 46 the other, the two sections together forming a valve casing held together by bolts as 47. 48 is a valve seat adapted to cooperate with a sealing element 49. 50 is the face of said sealing element adapted to cooperate with said seat 48. 50 is a constrictor which, it will be noted, has a face $51^a$ substantially in a plane parallel with the face 50 of the sealing element. 52 is a spring interposed between the said constrictor and the sealing element. 53 indicates an annular indenture in the constrictor 51 adapted to receive the sealing element 49, so that the said sealing element will be moved with the operation of the constrictor element. $51^b$ is a face formed in the section 45 of the conduit, said face being in a plane parallel with the plane of the face $51^a$ of the constrictor, said two faces being adjustably related according to a predetermined dimension, the manner of such adjustment will be presently described. 54 is a shaft axially mounted within the bearings 55. 56 is an arm radiating from said shaft and carrying said constrictor element 51. The said shaft 54 is axially adjustable in a plane parallel with the axis of the conduit, the same being engaged by the knob 58, the adjustment of said shaft longitudinally being controlled by the screws 59 and 60, such control operating to establish the relation between the faces $51^a$ and $51^b$ and to fix the dimension of the aperture between the faces $51^a$ of the constrictor and $51^b$ of the casing 45, so as to determine the capacity of the aperture through which the filtration or leakage may be permitted to escape as heretofore described. 61 is a lever adapted to control the rotation of the shaft 54, and in like manner the movement of the constrictor and sealing element in the arc of a circle.

In Fig. 2 is illustrated a familiar type of slide valve viewed on the line x—x of Figure 1. It will be noted that the sealing element 49 is of less diameter than the constrictor element 51, but the respective ports are of the same diameter so that with the rotation of the arm 56 the sealing element 49 will move off of its seat 48 surrounding its port to a certain extent or degree before the face of the constrictor element $51^a$ has moved out of corresponding relation with its opposed face $51^b$ surrounding its port. The relative relation of these movements is intended to be such that at the time that the constrictor has begun to uncover its port, the sealing element will have sufficiently uncovered its port to remove the danger incident to the rapid flow of fluid through the aperture formed by such opening, thus avoiding what is known in the art as dangers to a valve incident to wiredrawing. In Figures 3 and 4 are diagrammatically illustrated the relative position of said sealing element and constrictor in relation to their respective ports at one stage of their operation, from which the accomplishment of the foregoing purpose will be apparent.

The operation of said device is as follows. Leakage through the constrictor is limited by the capacity thereof as stated. When it is desired to open the valve, the bleeder pipe 5 is opened by means of its controlling valve, thus bleeding from the valve casing a predetermined quantity of fluid, which it is intended shall be in excess of the amount of fluid permitted to leak through the constrictor, thus reducing the pressure controlled by the sealing element 49 at the commencement of the opening of the valve and until such time as the constrictor is moved out of its full constrictive relation with its port as in Figure 4. When the valve is opened the bleeder pipe 5 is closed and so, vice versa, to close the valve the bleeding pipe 5 is opened until such time as the valve is completely closed.

Referring to Figure 5, the elements are all the same as those illustrated in Figures 1 to 4, inclusive, with the exception that in this case the section of the conduit indicated as 45 is of less diameter than that section indicated as 46, the purpose of this reduction of the diameter of one of said sections of the conduit being the same as that previously described. When the valve is opened the flow of fluid is through the section of lesser diameter to that of greater diameter, the result being that where the fluid is carrying foreign matter in suspension, such foreign matter will be less likely under this construction to lodge in the valve casing.

From the foregoing it will be noted that apparatus has been assembled and associated for the purpose of accomplishing a method of operation adapted to achieve certain results, to wit, the reduction of fluid pressure controlled by a valve so that the valve can be more readily opened and closed, that is to say, with less expenditure of force, less stress and wear on the operating parts and also with reduction of dangers incident to shock. Furthermore, provision is made for the handling of fluids having foreign matter suspended therein so that the valve will be in part relieved of the objectionable features incident to the contact of said foreign particles with the valve elements during the period of opening and closing of the valve, and also for the purpose of so directing the flow of fluid through the valve casing as to avoid to a certain extent the deposit of foreign matter in the valve casing in a way to interfere with the operation of the valve elements.

What I claim is:

1. In an apparatus wherein fluid under pressure is confined and permitted to flow within a conduit, such flow being controlled by an interposed slide valve, in combination with a constrictor interposed in said conduit in the path of the flow of the fluid to said valve, such constrictor comprising a port having an annular face and a movable element adapted to move in a plane parallel with said face and adjacent thereto, means to operate said slide valve and said movable element simultaneously, the relation between the slide valve and the movable element being such that the slide valve is partially open before the movable element has been moved from its normal position as a constrictor of the port partially closed thereby, into a position where it permits the unrestricted flow of fluid through the conduit, and means to operate said valve and constrictor.

2. In an apparatus wherein fluid under pressure is confined and permitted to flow within a conduit, such flow being controlled by an interposed slide valve in combination with a constrictor interposed in said conduit in the path of the flow of the fluid to said valve, such constrictor comprising a port having an annular face and a movable element adapted to move in a plane parallel with that of said face, means to adjust said movable element with reference to said face so as to limit the degree of constriction of the flow of the fluid between said element and said face, means to operate said slide valve and said movable element simultaneously, the relation between the slide valve and the movable element being such that the slide valve is partially open before the movable element has been moved from its normal position as a constrictor of the port partially closed thereby, into a position where it permits the unrestricted flow of fluid through the conduit, and means to operate said valve and constrictor.

3. In an apparatus wherein fluid under pressure is confined and permitted to flow within a conduit, a valve casing interposed in said conduit with an intake and outlet port in said casing, a slide valve operating to control said outlet port, a constrictor element mounted to operate in a plane parallel with the plane in which the slide valve is mounted to move, the same adapted to partially close the intake port, with means to operate said slide valve and constrictor in harmony, and means to adjust said constrictor with reference to said intake port, so as to limit the flow of fluid therethrough, the relation between the slide valve and said constrictor being such that in the operation thereof the slide valve is partially opened before the constrictor operates to relieve its restraint upon the flow of fluid through the intake port, with means to bleed from said casing the fluid lying between said slide valve and said constrictor element, and means to control said bleeder means.

4. In an apparatus wherein fluid under pressure is confined and permitted to flow within a conduit, a valve casing interposed in said conduit, with an intake and outlet port in said casing, the same being in axial alignment, a shaft mounted for rotation and longitudinal adjustment, the axis of the shaft being parallel with the axis of the ports in the casing, an arm radiating from said shaft and carrying a constrictor disk element adapted to cooperate with the intake port to partially constrict the same when in juxtaposition therewith, the measure of said constriction being determined by the longitudinal adjustment of said shaft, a valve sealing element carried by said constrictor disk adapted to cooperate with a suitable valve seat for sealing the outlet port of said casing, elastic means interposed between said sealing element and said constrictor disk, and means for securing said constrictor disk and valve sealing element together so that they are moved together by the rotation of the shaft, and means to rotate the said shaft, the relative size of the valve sealing element and the constrictor disk with reference to the ports controlled respectively by each being such that the sealing element partially uncovers its port before the constrictor element is moved to a position where it uncovers its port, a pipe controlled by a valve leading from said casing for the purpose of bleeding the fluid contained within the casing, substantially as described.

5. In an apparatus wherein fluid under pressure is confined and permitted to flow within a conduit, a valve casing interposed in said conduit, with an intake and outlet port in said casing, the same being in axial alignment, a shaft mounted for rotation and longitudinal adjustment, the axis of the shaft being parallel with the axis of the ports in the casing, an arm radiating from said shaft and carrying a constrictor disk element adapted to cooperate with the intake port to partially constrict the same when in juxtaposition therewith, the measure of said constriction being determined by the longitudinal adjustment of said shaft, a valve sealing element carried by said constrictor disk adapted to cooperate with a suitable valve seat for sealing the outlet port of said casing, elastic means interposed between said sealing element and said constrictor disk, and means for securing said constrictor disk and valve sealing element together, so that they are moved together by the rotation of the shaft, and means to rotate the said shaft, the relative size of the valve sealing element and the constrictor with reference to the ports controlled respectively by each being such that the sealing element partially uncovers its port before the constrictor element is moved to a position where it uncovers its port, a pipe controlled by a valve leading from said casing for the purpose of bleeding the fluid contained within the casing substantially as described, said conduit being formed in two sections, the intake section being of less diameter than the outflow section, said valve casing being interposed between the two sections, the constrictor being adjacent the conduit of less diameter and the valve controlling the outlet to the conduit of greater diameter.

Signed by me at Jersey City, N. J. this 19th day of June, 1923.

WYLIE G. WILSON.